United States Patent
Cai (10) Patent No.: US 11,341,329 B2
(45) Date of Patent: May 24, 2022

(54) SYSTEM LANGUAGE SWITCHING METHOD, READABLE STORAGE MEDIUM, TERMINAL DEVICE, AND APPARATUS

(71) Applicant: PING AN TECHNOLOGY (SHENZHEN) CO., LTD., Guangdong (CN)

(72) Inventor: Jinsheng Cai, Shenzhen (CN)

(73) Assignee: PING AN TECHNOLOGY (SHENZHEN) CO., LTD., Shenzhen (CN)

( * ) Notice: Subject to any disclaimer, the term of this patent is extended or adjusted under 35 U.S.C. 154(b) by 721 days.

(21) Appl. No.: 16/328,200

(22) PCT Filed: Jan. 31, 2018

(86) PCT No.: PCT/CN2018/074867
§ 371 (c)(1),
(2) Date: Feb. 25, 2019

(87) PCT Pub. No.: WO2019/127833
PCT Pub. Date: Jul. 4, 2019

(65) Prior Publication Data
US 2021/0326529 A1    Oct. 21, 2021

(30) Foreign Application Priority Data
Dec. 26, 2017    (CN) .......................... 201711434263.3

(51) Int. Cl.
*G06F 40/263* (2020.01)
*G06F 40/242* (2020.01)
(Continued)

(52) U.S. Cl.
CPC ........ *G06F 40/263* (2020.01); *G06F 16/5846* (2019.01); *G06F 40/242* (2020.01);
(Continued)

(58) Field of Classification Search
CPC .. G06F 40/263; G06F 16/5846; G06F 40/242; G06V 10/443; G06V 20/62;
(Continued)

(56) References Cited

FOREIGN PATENT DOCUMENTS

| CN | 105511857 A | * | 4/2016 |
| CN | 105511857 A |   | 4/2016 |

(Continued)

OTHER PUBLICATIONS

Keysers, Daniel et al. "Multi-Language Online Handwriting Recognition", IEEE Transactions on Pattern Analysis and Machine Intelligence, vol. 39, No. 6, Jun. 2017, pp. 1180-1194.
(Continued)

*Primary Examiner* — Pierre Louis Desir
*Assistant Examiner* — Keisha Y. Castillo-Torres
(74) *Attorney, Agent, or Firm* — Loza & Loza, LLP; Michael F. Fedrick (57) ABSTRACT

The present application relates to a system language switching method, a computer readable storage medium, a terminal device, and a device. The method includes first obtaining a preset image for setting a system language of a target terminal, then extracting text information in the image and determining a target language corresponding to the text information, and finally switching the system language of the target terminal to the target language. Through the present application, the user only needs to prepare an image for setting the system language of the target terminal in advance, for example, a piece of paper with Chinese written, and a system can obtain the text information on the image through the processes of image acquisition, text information extraction, and the like, determine that the text message is Chinese, and finally switch the system language of the target terminal to Chinese.

9 Claims, 6 Drawing Sheets (51) Int. Cl.
   *G06F 16/583*   (2019.01)
   *G06T 5/00*     (2006.01)
   *G06V 10/44*    (2022.01)
   *G06V 20/62*    (2022.01)

(52) U.S. Cl.
   CPC ............ *G06T 5/002* (2013.01); *G06V 10/443* (2022.01); *G06V 20/62* (2022.01)

(58) Field of Classification Search
   CPC .... G06V 30/10; G06V 10/28; G06V 30/2445; G06T 5/002
   See application file for complete search history.

(56) References Cited

FOREIGN PATENT DOCUMENTS

| | | | |
|---|---|---|---|
| CN | 105868758 A | * | 8/2016 |
| CN | 105979403 A | | 9/2016 |
| CN | 105868758 A | | 8/2017 |
| CN | 107391122 A | * | 11/2017 |
| CN | 107391122 A | | 11/2017 |
| CN | 107426456 A | | 12/2017 |
| JP | 2013239203 A | | 11/2013 |
| JP | 2015122650 A | | 7/2015 |

OTHER PUBLICATIONS

First Office Action for corresponding Japanese Patent Application, JP2018-553236, dated Mar. 12, 2020, 7 pages.
Invitation to Respond to Written Opinion for Singapore Patent Application No. 11201902498R dated Jul. 1, 2020; 8 pages.

* cited by examiner

SYSTEM LANGUAGE SWITCHING METHOD, READABLE STORAGE MEDIUM, TERMINAL DEVICE, AND APPARATUS

CROSS-REFERENCE TO RELATED APPLICATIONS

The present application is the U.S. national stage of International Patent Application No. PCT/CN2018/074867, filed on Jan. 31, 2018, which claims the benefit of priority under 35 U.S.C. § 119 of Chinese Patent Application No. 201711434263.3, entitled "SYSTEM LANGUAGE SWITCHING METHOD AND TERMINAL DEVICE", filed with the China Patent Office on Dec. 26, 2017. The content of the foregoing applications is incorporated herein by reference in its entirety.

TECHNICAL FIELD

The present application relates to the technical field of computers, and particularly to a system language switching method, a terminal device, and an apparatus, and a computer readable storage medium.

BACKGROUND

At present, the system language is generally set on the setting interfaces in various intelligent terminals, and an operation path is very deep. Users often need to perform multiple operations to complete the system language setting process, and the operations are cumbersome. For example, some terminals must be subjected to multi-layer selection of settings, advanced settings, language and input method, language, etc., and then the system language setting can be made in a language choice box. Moreover, for a user who does not understand the current system language, it is more difficult to complete these operations because he does not understand the meanings of the various options in these operations. For example, if a user who does not understand English wants to switch an English system to a Chinese system, faced with various options on the terminal, he may not know how to get started, and the user experience is extremely poor.

SUMMARY

In view of this, an embodiment of the present application provides a system language switching method, a terminal device, an apparatus, and a computer readable storage medium, to solve the problems that system language switching operations are cumbersome and the user experience is poor.

A first aspect of an embodiment of the present application provides a system language switching method, which includes:

obtaining a preset image for setting a system language of a target terminal;

extracting text information in the image;

determining a target language corresponding to the text information; and switching the system language of the target terminal to the target language.

A second aspect of an embodiment of the present application provides a computer readable storage medium which stores computer readable instructions, where when the computer readable instructions are executed by a processor, the following steps are implemented:

obtaining a preset image for setting a system language of a target terminal;

extracting text information in the image;

determining a target language corresponding to the text information; and switching the system language of the target terminal to the target language.

A third aspect of an embodiment of the present application provides a system language switching terminal device, which includes a memory, a processor, and computer readable instructions stored in the memory and executable on the processor, where the processor implements the following steps when executing the computer readable instructions:

obtaining a preset image for setting a system language of a target terminal;

extracting text information in the image;

determining a target language corresponding to the text information; and switching the system language of the target terminal to the target language.

A fourth aspect of an embodiment of the present application provides a system language switching apparatus, which includes:

an image obtaining module, configured to obtain a preset image for setting a system language of a target terminal;

a text information extraction module, configured to extract text information in the image;

a target language determination module, configured to determine a target language corresponding to the text information; and a system language switching module, configured to switch the system language of the target terminal to the target language.

Compared with the prior art, embodiments of the present application have the beneficial effects that in the embodiments of the present application, first a preset image for setting a system language of a target terminal is obtained, then text information in the image is extracted and a target language corresponding to the text information is determined, and finally the system language of the target terminal is switched to the target language. Through the present application, the user only needs to prepare an image for setting the system language of the target terminal in advance, for example, a piece of paper with Chinese written, and a system can obtain the text information on the image through the processes of image acquisition, text information extraction, and the like, determine that the text message is Chinese, and finally switch the system language of the target terminal to Chinese. Operations in the entire process are extremely simple and convenient, greatly improving the user experience.

DETAILED DESCRIPTION OF EMBODIMENTS

Figure 1:
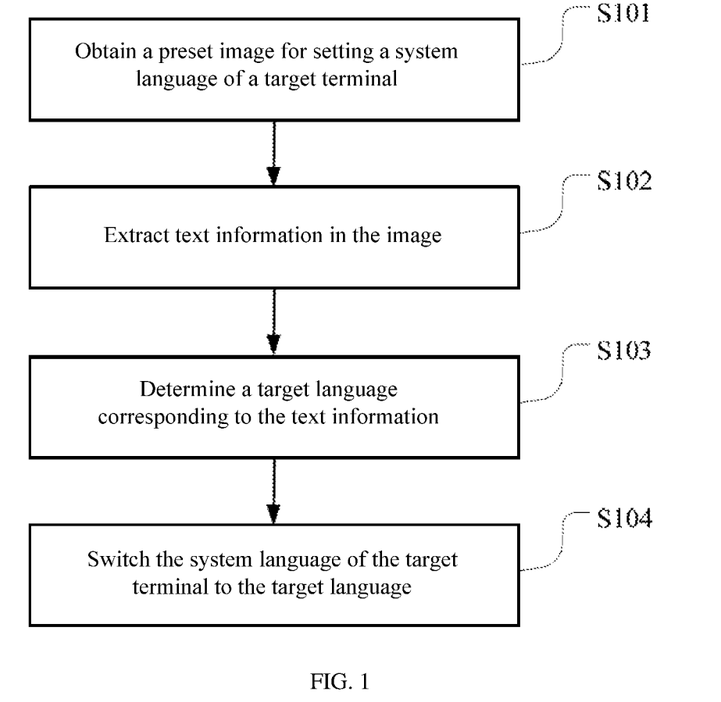
FIG. 1 is a flow chart of a system language switching method according to an embodiment of the present application.

Referring to FIG. 1, a system language switching method according to an embodiment of the present application may include:

Step S101: Obtain a preset image for setting a system language of a target terminal.

The image contains text information of a target language. For example, if a user wants to switch the system language to Chinese, that is, the target language is Chinese, the user can write a Chinese word of "Chinese" on a piece of paper, or write other Chinese information and then shoot using a camera function of the target terminal, to obtain the image containing the text information.

Step S102: Extract text information in the image.

Figure 2:
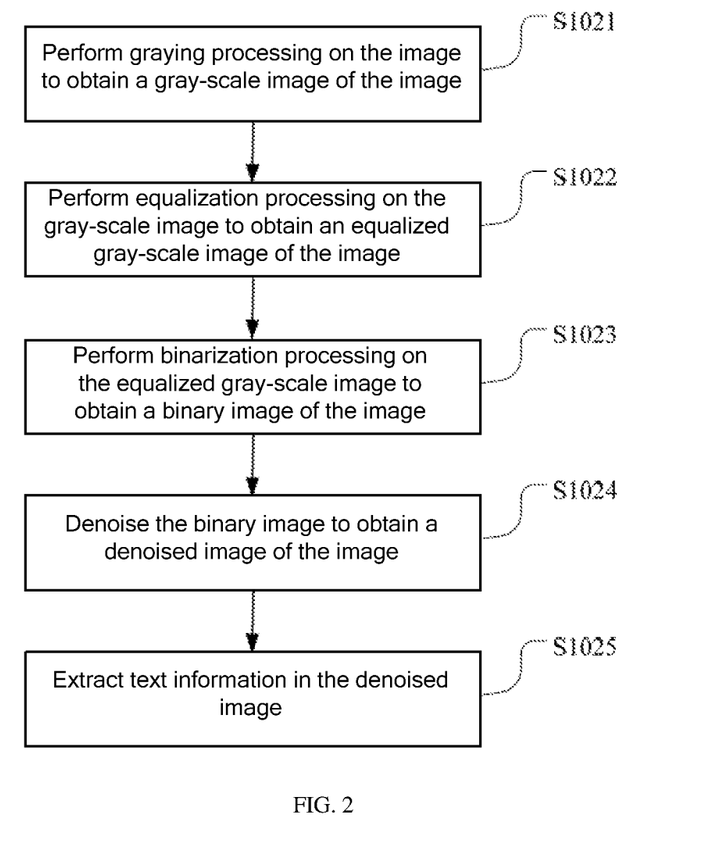
FIG. 2 is a schematic flow chart of step S102 of a system language switching method in an application scenario according to an embodiment of the present application.

Preferably, as shown in FIG. 2, step S102 may include the following specific process:

Step S1021: Perform graying processing on the image to obtain a gray-scale image of the image.

The original state of the image is generally in the form of RGB, where R represents a red component, G represents a green component, and B represents a blue component, and the graying processing converts an image represented in the RGB form into an image represented in the gray value form, namely a gray-scale image.

Specifically, the conversion between the two can be done by the following formula:

$$Gray = R*0.3 + G*0.59 + B*0.11,$$

where gray represents the gray value after conversion.

Step S1022: Perform equalization processing on the gray-scale image to obtain an equalized gray-scale image of the image.

The gray-scale distribution of the gray-scale image is subjected to equalization processing, so that the gray-scale distribution changes from a certain concentrated gray-scale interval to uniform distribution in the whole gray-scale range, that is, the image is nonlinearly stretched, and the image gray value is redistributed, so that the number of pixels in a certain gray-scale range is approximately the same. Therefore, a better binarization effect can be achieved.

Specifically, in the equalization processing process, firstly a distribution probability of each of gray values in a gray-scale image is counted, and then a cumulative distribution probability of each of the gray values is calculated according to the distribution probability; and based on the cumulative distribution probability, each of the gray values is subjected to mapping according to a preset mapping rule, to obtain each of mapped gray values, where each of mapped gray value is proportional to the corresponding cumulative distribution probability, and finally, each of the mapped gray value is rounded to obtain the each of rounded gray values.

A simple example is as follows: if there are four gray values in the gray-scale image, which are 50, 75, 103, and 128, respectively, and the distribution probabilities of the gray-scale values are 0.2, 0.3, 0.1, and 0.4, respectively, it can be calculated that the cumulative distribution probabilities of the gray values are 0.2, 0.5, 0.6, and 1, respectively; and the mapping rule is set to: $m_i = (m_{max} - m_{min})*p_i$, where i is the serial number of the current gray value, and $p_i$ is the cumulative distribution probability corresponding to i, $m_i$ is the mapped gray value, $m_{max}$ is the maximum gray value and is 255 in this example, and $m_{min}$ is the minimum gray value and is 0 in this example. According to the above mapping relationship, the four gray values after mapping can be obtained and are 51, 127.5, 153, and 255, respectively, and are rounded to 51, 128, 153, and 255.

Step S1023: Perform binarization processing on the equalized gray-scale image to obtain a binary image of the image.

The binarization of the image is to set the gray value of pixels on the image to 0 or 255, that is, to present the entire image with a distinct black and white visual effect. An image includes a target object, background, and noise. To extract the target object directly from the multi-value digital image, the most common method is to set a global threshold T, and use T to divide data of the image into two parts: a pixel group larger than T and a pixel group smaller than T. The pixel value of the pixel group larger than T is set to white (or black), and the pixel value of the pixel group smaller than T is set to black (or white).

In this solution, an adaptive threshold binarization algorithm is preferably used to binarize the image, divide the image into smaller blocks, calculate a histogram of each block respectively, and calculate the threshold for each block according to the peak value of each histogram. The threshold of each pixel is obtained by interpolation based on the threshold of the adjacent block.

Step S1024: Denoise the binary image to obtain a denoised image of the image.

First, each connected domain in the binary image is determined, where the connected domain is a set formed by pixels that are connected to each other and have the same gray value. In this solution, eight neighborhoods are used, that is, around each pixel eight adjacent pixels are used as pixels in connection therewith. Then, the number of the pixels in each connected domain is calculated, and the connected domain whose number of pixels is less than the preset threshold is determined as the connected domain to be adjusted, where the threshold can be set according to the actual situation. For example, the threshold can be set to 10 or other values.

The black and white pixels are reversed for each pixel in the connected domain, that is, each original white pixel is changed to a black pixel, and each original black pixel is changed to a white pixel, to obtain the denoised image.

Step S1025: Extract text information in the denoised image.

Through the above processing process, in the denoised image, the interference caused by various factors such as light brightness, shadow, and noise on the paper during the photographing process is effectively eliminated, and a graph in the denoised image can be directly extracted and processed and used as text information to be further identified.

Step S103: Determine a target language corresponding to the text information.

Figure 3:
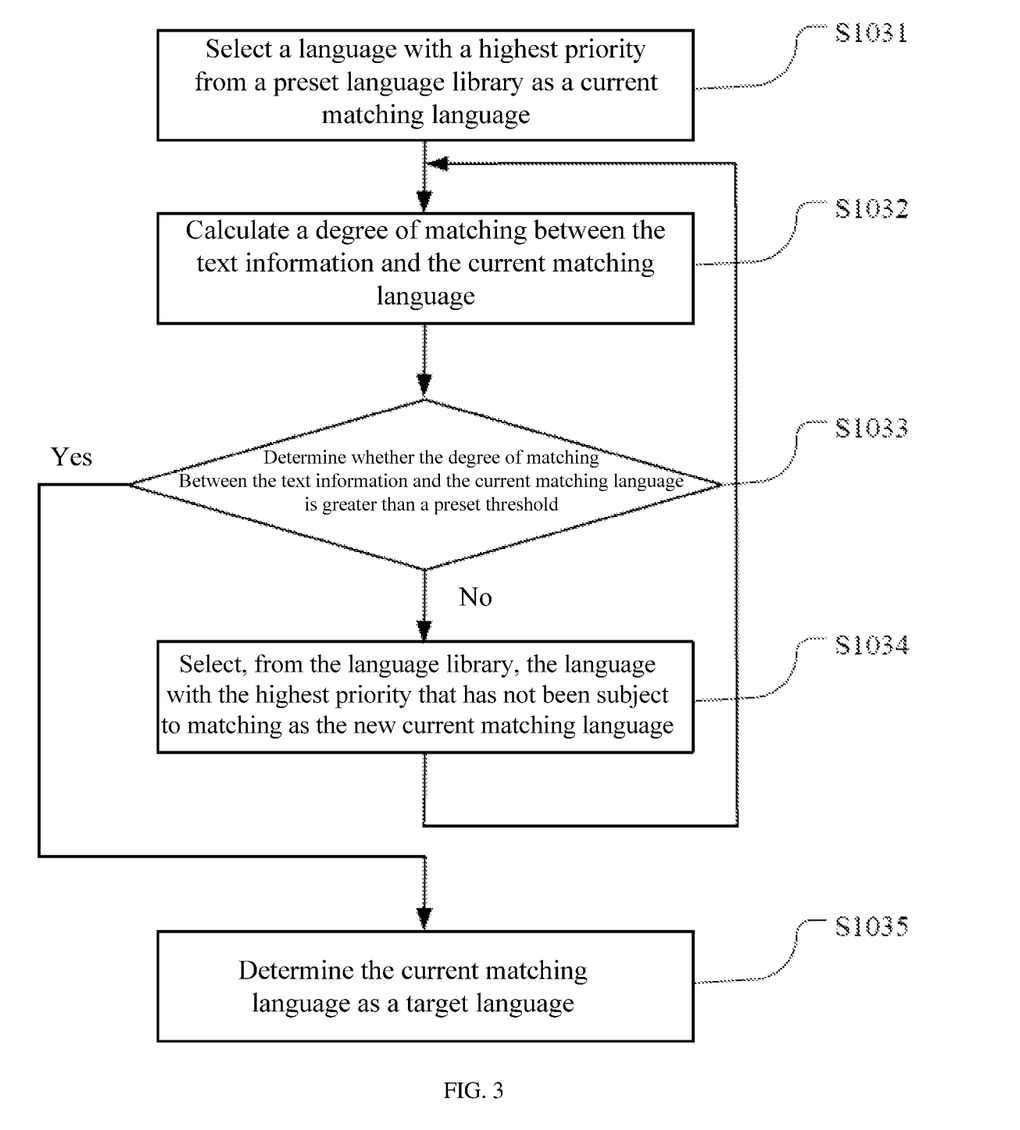
FIG. 3 is a schematic flow chart of step S103 of a system language switching method in an application scenario according to an embodiment of the present application.

Preferably, as shown in FIG. 3, step S103 may include the following specific process:

Step S1031: Select a language with a highest priority from a preset language library, as a current matching language.

The priority may be determined according to actual conditions, for example, may be determined according to the number of people using various languages, the range of usage regions, and the like.

Step S1032: Calculate a degree of matching between the text information and the current matching language.

In this embodiment, an identification template of the current matching language may be established in advance. In English, for example, a set including 26 English letters may be used as an identification template, and characters in the text information are respectively compared with the identification template. If the character is found in the identification template, the character is successfully matched. If the character is not found in the identification template, the character matching fails. Finally, by dividing the number of successfully matched characters by the total number of the characters, the degree of matching between the text information and the current matching language can be obtained.

Step S1033: Determine whether the degree of matching between the text information and the current matching language is greater than a preset threshold.

The threshold of the degree of matching may be set to 70%, 80%, or 90%, or the like according to the actual situation, which is not specifically limited in this embodiment.

If the degree of matching between the text information and the current matching language is less than or equal to the threshold, step S1034 is executed; and if the degree of matching between the text information and the current matching language is greater than the threshold, then step S1035 is performed.

Step S1034: Select, from the language library, the language with the highest priority that has not been subject to matching as the new current matching language.

For example, a standard symbol can be set to indicate whether a language has been matched. If an identifier of a language has a value of 0, it means that the language has not been matched. If the identifier of the language has a value of 1, it means that the language has been matched. The initial value of the identifier is 0, and after the language has been matched, the identifier of the language is set to 1, that is, it is identified that the language has been matched.

After step S1034 is performed, the process returns to execute step S1032 and subsequent steps.

Step S1035: Determine the current matching language as a target language.

For example, if the current matching language is Chinese, and the degree of matching between the current matching language and the text information is greater than the matching degree threshold, at this time Chinese may be determined as the target language.

Step S104: Switch the system language of the target terminal to the target language.

Figure 4:
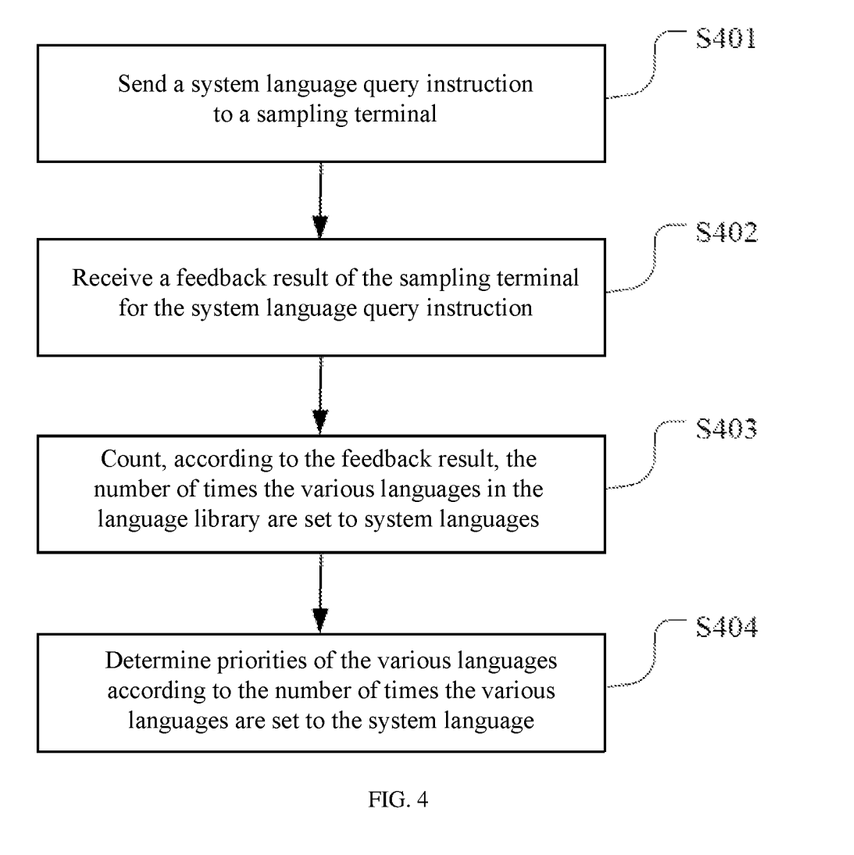
FIG. 4 is a schematic flowchart of a priority setting process of a language according to an embodiment of the present application.

Preferably, as shown in FIG. 4, the setting process of the priority of the language in the language library may specifically include:

Step S401: Send a system language query instruction to a sampling terminal.

The sampling terminal is a preset terminal that is used as a statistical sample during statistics of system language settings. In order to ensure the accuracy of the final statistical result, the number of the sampling terminals should be greater than a certain threshold, such as 10000, and 20000, and the specific value can be set according to the actual situation.

Step S402: Receive a feedback result of the sampling terminal for the system language query instruction.

The feedback result carries current system language settings of the sampling terminal. For example, if the current system language of the sampling terminal A is Chinese, the feedback result is in Chinese. If the current system language of the sampling terminal B is English, then the feedback result is in English.

Step S403: Count, according to the feedback result, the number of times the respective language in the language library is set to the system language.

Step S404: Determine priorities of the various languages according to the number of times the respective language is set to the system language.

The priorities of the languages are positively related to the number of times the respective language is set to the system language. That is, in statistical results, the more times a language is set to the system language, the higher its priority. For example, according to the statistical data, if the number of terminals in which the language A is set to the system language is 10000, the number of terminals in which the language B is set to the system language is 5000, and the number of terminals in which the language C is set to the system language is 1000, then it can be determined that the priority order is language A, language B, and language C from high to low.

Figure 5:
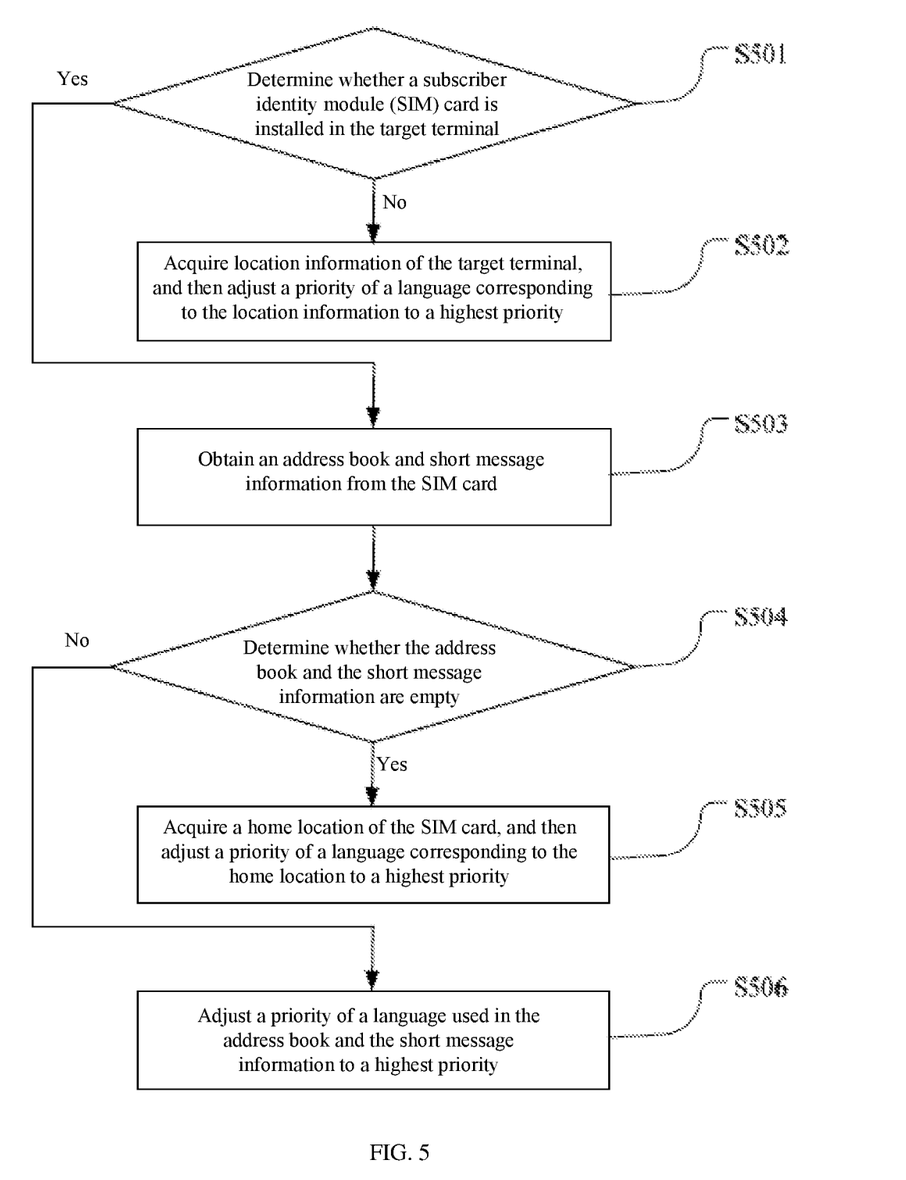
FIG. 5 is a schematic flowchart of personalized adjustment of the default priority according to an embodiment of the present application.

The general default priority order is completed by the process shown in FIG. 4. In order to further improve the efficiency of the identification, the default priority can also be subjected to personalized adjustment according to the situation of the target terminal. The specific adjustment process is as shown in FIG. 5:

Step S501: Determine whether a subscriber identity module (SIM) card is installed in the target terminal.

The SIM card is also known as a smart card and user identification card. Generally, the SIM card must be installed on a mobile phone before a call can be normally performed. The SIM card stores the customer information of a digital mobile phone through a computer chip. When a terminal is powered on for the first time, a terminal system is activated, and the system automatically detects whether the SIM card is installed in the terminal. For example, in the Android system, the SIM_STATE_ABSENT attribute item of the TelephonyManager class can be used to determine whether the SIM card is installed in the terminal.

If the SIM card is not installed in the target terminal, step S502 is performed. If the SIM card is installed in the target terminal, step S503 and subsequent steps are performed.

Step S502: Acquire location information of the target terminal, and then adjust a priority of a language corresponding to the location information to a highest priority.

The location information of the target terminal may be acquired by GPS, then a country corresponding to the location information is determined, and the priority of the language of this country is adjusted to the highest priority. For example, if the obtained location information indicates that the location is in China, the priority of Chinese is adjusted to the highest priority.

Step S503: Obtain an address book and short message information from the SIM card.

For example, in the Android system, address book information in the SIM card, such as the name of the contact, phone number, and comment information, can be obtained by the function getContentResolver( ) the parameter "content://icc/adn" or the parameter "content://sim/adn"; and short message information corresponding to contacts in the SIM card is read through the function getContentResolver( ) the parameter "content://sms/", the parameter "content://sms/inbox", and the parameter "content://sms/sent" parameter.

Step S504: Determine whether the address book and the short message information are empty.

If the address book and the short message information are empty, step S505 is performed, and if the address book and the short message information are not empty, step S506 is performed.

Step S505: Acquire a home location of the SIM card, and then adjust a priority of a language corresponding to the home location to a highest priority.

Specifically, an International Mobile Subscriber Identification Number (IMSI) indicated by a preset field in the SIM card may be read. The IMSI includes a mobile country code (MCC), which is composed of three digits and is used to uniquely identify the country which the SIM card belongs to. For example, when the MCC is 460, the country which the SIM card belongs to is China.

Step S506: Adjust a priority of a language used in the address book and the short message information to a highest priority.

For example, when it is queried in record information of contacts that the name is "Zhang San", by identifying code information of the text content "Zhang San", a system obtains that the language corresponding to the code is Chinese, and then it is determined that the language type of this contact is Chinese. For example, if the read text content is "Don't forget to lock the door when you leave" in the short message of the contact, the system identifies that the language corresponding to the code information is English, and it is determined that the language type of the contact is English. When the language type is obtained according to the phone number, after the phone number is queried, the terminal obtains home location information of the number by querying from a server or a query interface of a third-party home location query server set up by an operator, and the language type can be set according to the home location information. For example, the phone number read by the terminal is +1-7654321111, it is queried from the server that the international code of this number is 1 and the home location is US, and thus the language type of the contact is considered to be English.

In conclusion, in the embodiments of the present application, first a preset image for setting a system language of a target terminal is obtained, then text information in the image is extracted and a target language corresponding to the text information is determined, and finally the system language of the target terminal is switched to the target language. Through the present application, the user only needs to prepare an image for setting the system language of the target terminal in advance, for example, a piece of paper with Chinese written, and a system can obtain the text information on the image through the processes of image acquisition, text information extraction, and the like, determine that the text message is Chinese, and finally switch the system language of the target terminal to Chinese. Operations in the entire process are extremely simple and convenient, greatly improving the user experience.

It should be understood that the size of the serial numbers of the steps in the above embodiments does not mean the order of execution. The order of execution of each process should be determined by its function and internal logic, and should not be construed as limiting the implementation process of the embodiments of the present application.

Figure 6:
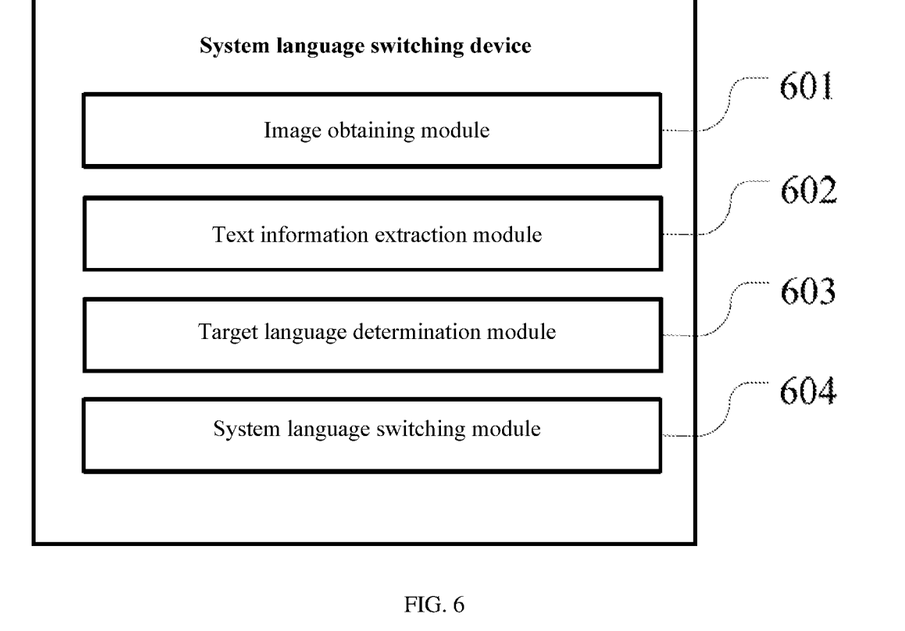
FIG. 6 is a structure chart of a system language switching apparatus according to an embodiment of the present application.

Corresponding to a system language switching method described in the foregoing embodiment, FIG. 6 illustrates a structural diagram of a system language switching apparatus according to an embodiment of the present application.

In this embodiment, a system language switching apparatus may include:

an image obtaining module 601, configured to obtain a preset image for setting a system language of a target terminal;

a text information extraction module 602, configured to extract text information in the image;

a target language determination module 603, configured to determine a target language corresponding to the text information; and a system language switching module 604, configured to switch the system language of the target terminal to the target language.

Further, the target language determination module may include:

a current matching language selection unit, configured to select a language with a highest priority from a preset language library, as a current matching language;

a matching degree calculation unit, configured to calculate a degree of matching between the text information and the current matching language;

a current matching language replacement unit, configured to select, from the language library, the language with a highest priority that has not been matched as the new current matching language, if the degree of matching between the text information and the current matching language is less than or equal to a preset threshold; and a target language determining unit, configured to determine the current matching language as the target language if the degree of matching between the text information and the current matching language is greater than the threshold.

Further, the system language switching apparatus may include:

a query instruction sender module, configured to send a system language query instruction to a sampling terminal, where the sampling terminal is a preset terminal that is used as a statistical sample during statistics of system language settings;

a feedback result receiver module, configured to receive a feedback result of the sampling terminal for the system language query instruction;

a number statistics module, configured to calculate, according to the feedback result, the number of times the respective language in the language library is set to the system language; and a priority determination module, configured to determine priorities of the various languages according to the number of times the respective language is set to the system language, where the priority of the respective language is positively related to the number of times the respective language is set to the system language.

Further, the system language switching apparatus may include:

a first adjustment module, configured to, if an SIM card is not installed in the target terminal, acquire location information of the target terminal, and then adjust a priority of a language corresponding to the location information to a highest priority;

an information acquisition module, configured to obtain an address book and short message information from the SIM card if the SIM card is installed in the target terminal;

a second adjustment module, configured to adjust a priority of a language used in the address book and the short message information to a highest priority if the address book and the short message information are not empty; and a third adjustment module, configured to acquire a home location of the SIM card if the address book and the short message information are empty, and then adjust a priority of a language corresponding to the home location to a highest priority.

Further, the text information extraction module may include:

a graying processing unit, configured to perform graying processing on the image to obtain a gray-scale image of the image;

an equalization processing unit, configured to perform equalization processing on the gray-scale image to obtain an equalized gray-scale image of the image;

a binarization processing unit, configured to perform binarization processing on the equalized gray-scale image to obtain a binary image of the image;

a denoising processing unit, configured to denoise the binary image to obtain a denoised image of the image; and a text information extraction unit, configured to extract text information in the denoised image.

Figure 7:
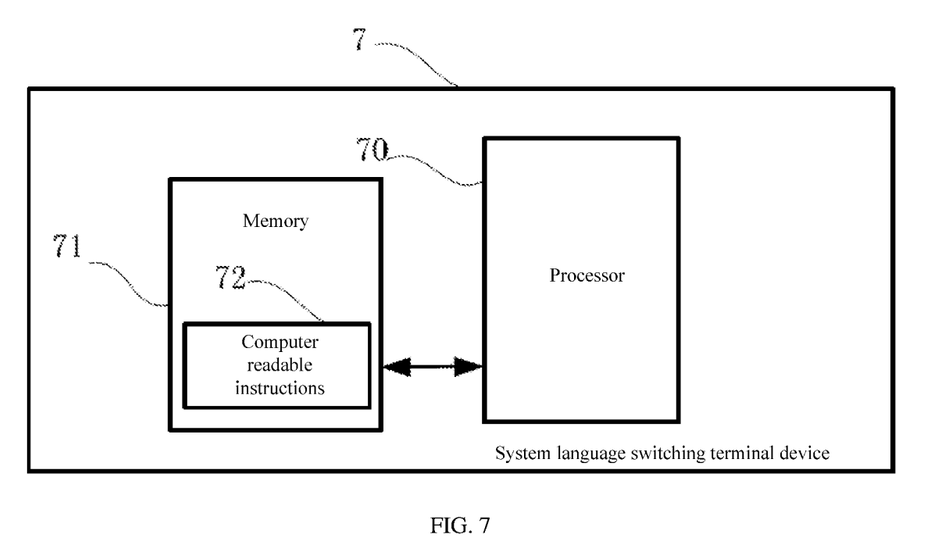
FIG. 7 is a schematic block diagram of a system language switching terminal device according to an embodiment of the present application.

FIG. 7 illustrates a schematic block diagram of a system language switching terminal device according to an embodiment of the present application. For convenience in description, only parts related to the embodiment of the present application are shown.

In this embodiment, the system language switching terminal device 7 may be a computing device such as a desk calculator, a notebook, a palmtop computer, and a cloud server. The system language switching terminal device 7 may include a processor 70, a memory 71, and computer readable instructions 72 stored in the memory 71 and executable on the processor 70, such as computer readable instructions for implementing the system language switching method described above. When the processor 70 executes the computer readable instructions 72, the steps in each foregoing embodiment of the system language switching method, such as steps S101 to S104 shown in FIG. 1, are implemented. Alternatively, when the processor 70 implements the computer readable instructions 72, functions of each module/unit in the various device embodiments described above, such as the functions of the modules 601 to 604 shown in FIG. 6, are implemented.

Illustratively, the computer readable instructions 72 can be partitioned into one or more modules/units that are stored in the memory 71 and executed by the processor 70, to complete the present application. The one or more modules/units may be a series of computer readable instruction segments capable of performing a particular function, and the instruction segments are used for describing the execution process of the computer readable instructions 72 in the system language switching terminal device 7.

The processor 70 may be a central processing unit (CPU), or may be other general-purpose processors, a digital signal processor (DSP), an application specific integrated circuit (ASIC), a field-programmable gate array (FPGA) or other programmable logic devices, discrete gates or transistor logic devices, discrete hardware components, etc. The general purpose processor may be a microprocessor or the processor or any conventional processor or the like.

The memory 71 may be an internal storage unit of the system language switching terminal device 7, such as a hard disk or a memory of the system language switching terminal device 7. The memory 71 may also be an external storage device of the system language switching terminal device 7, such as, a plug-in hard disk disposed on the terminal device 7, a smart memory card (SMC), a secure digital (SD) card, and a flash card. Further, the memory 71 may also include both an internal storage unit of the system language switching terminal device 7 and an external storage device. The memory 71 is configured to store the computer readable instructions and other instructions and data required by the system language switching terminal device 7. The memory 71 may also be used to temporarily store data that has been output or is about to be output.

Each functional unit in each embodiment of the present application may be integrated into one processing unit, or each unit may exist physically separately, or two or more units may be integrated into one unit. The above integrated unit can be implemented in the form of hardware or in the form of a software functional unit.

The integrated unit, if implemented in the form of a software functional unit and sold or used as an independent product, may be stored in a computer readable storage medium. Based on such understanding, the technical solution of the present application, in essence or the contribution to the prior art, or all or part of the technical solution may be embodied in the form of a software product. The computer software product is stored in a storage medium, and includes a plurality of computer readable instructions used to cause a computer device (which may be a personal computer, a server, or a network device, etc.) to perform all or part of the steps of the method described in various embodiments of the present application. The foregoing storage medium includes a USB flash disk, a mobile hard disk, a read-only memory (ROM), a random access memory (RAM), a magnetic disk, or an optical disk, and the like which can store computer readable instructions.

The above embodiments are only used to illustrate the technical solutions of the present application, and are not intended to limit the technical solutions; although the present application has been described in detail with reference to the foregoing embodiments, those of ordinary skills in the art should understand that they can still modify the technical solutions recorded in each aforementioned embodiment, or perform equivalent substitutions on some of the technical features therein; and such modifications or substitutions do not make the essence of the corresponding technical solution depart from the spirit and scope of the technical solution of each embodiment of the present application.

What is claimed is:

1. A system language switching method, comprising:
obtaining a preset image for setting a system language of a target terminal;
extracting text information in the preset image, wherein extracting the text information comprises:
performing graying processing on the preset image to obtain a gray-scale image of the preset image;
performing equalization processing on the gray-scale image, and mapping gray values of the gray-scale image according to a preset mapping rule, to obtain an equalized gray-scale image of the preset image, wherein each mapped gray value is proportional to a corresponding cumulative distribution probability;
performing binarization processing on the equalized gray-scale image to obtain a binary image of the preset image;
denoising the binary image to obtain a denoised image of the preset image; and
extracting text information in the denoised image;
determining a target language corresponding to the text information, wherein determining the target language comprises:
selecting a language with a highest priority from a preset language library, as a current matching language;

calculating a degree of matching between the text information and the current matching language, wherein calculating the degree of matching comprises:
  comparing characters in the text information with an identification template respectively, wherein if a character is found in the identification template, the character is successfully matched, and wherein if the character is not found in the identification template, the character matching fails;
  dividing a total number of successfully matched characters by a total number of the characters;
  obtaining the degree of matching between the text information and the current matching language, wherein if the degree of matching between the text information and the current matching language is less than or equal to a preset threshold, a language with a highest priority that has not been matched as the new current matching language is selected from the language library, and then the step of calculating the degree of matching between the text information and the current matching language is executed; and
  determining the current matching language as the target language if the degree of matching between the text information and the current matching language is greater than the threshold; and
switching the system language of the target terminal to the target language.

2. The system language switching method according to claim 1, wherein setting priorities of languages in the language library is performed by:
  sending a system language query instruction to a sampling terminal, wherein the sampling terminal is a preset terminal that is used as a statistical sample during statistics of system language settings;
  receiving a feedback result of the sampling terminal for the system language query instruction;
  counting, according to the feedback result, a number of times a respective language in the language library is set to the system language; and
  determining priorities of languages according to the number of times the respective language is set to the system language, wherein priority of the respective language is positively related to the number of times the respective language is set to the system language.

3. The system language switching method according to claim 2, wherein after the priorities of languages are determined according to the number of times the respective language is set to the system language, the method further comprises:
  if a SIM card is not installed in the target terminal, acquiring location information of the target terminal, and then adjusting a priority of a language corresponding to the location information to a highest priority;
  obtaining an address book and short message information from the SIM card if the SIM card is installed in the target terminal;
  adjusting a priority of a language used in the address book and the short message information to a highest priority if the address book and the short message information are not empty;
  if the address book and the short message information are empty, acquiring a home location of the SIM card and then adjusting a priority of a language corresponding to the home location to a highest priority.

4. A non-transitory computer readable storage medium which stores computer readable instructions, wherein when the computer readable instructions are executed by a processor, the following steps are implemented:
  obtaining a preset image for setting a system language of a target terminal;
  extracting text information in the preset image, wherein extracting the text information comprises:
  performing graying processing on the preset image to obtain a gray-scale image of the preset image;
  performing equalization processing on the gray-scale image, and mapping gray values of the gray-scale image according to a preset mapping rule, to obtain an equalized gray-scale image of the preset image, wherein each mapped gray value is proportional to a corresponding cumulative distribution probability;
  performing binarization processing on the equalized gray-scale image to obtain a binary image of the preset image;
  denoising the binary image to obtain a denoised image of the preset image; and
  extracting text information in the denoised image;
  determining a target language corresponding to the text information, which includes:
  selecting a language with a highest priority from a preset language library, as a current matching language;
  calculating a degree of matching between the text information and the current matching language, wherein calculating the degree of matching comprises:
    comparing characters in the text information with an identification template respectively, wherein if a character is found in the identification template, the character is successfully matched, and wherein if the character is not found in the identification template, the character matching fails;
    dividing a total number of successfully matched characters by a total number of the characters; and
    obtaining the degree of matching between the text information and the current matching language, wherein if the degree of matching between the text information and the current matching language is less than or equal to a preset threshold, a language with a highest priority that has not been matched as the new current matching language is selected from the language library, and then the step of calculating the degree of matching between the text information and the current matching language is executed; and
  determining the current matching language as the target language if the degree of matching between the text information and the current matching language is greater than the threshold; and
  switching the system language of the target terminal to the target language.

5. The non-transitory computer readable storage medium according to claim 4, wherein setting priorities of languages in the language library is performed by:
  sending a system language query instruction to a sampling terminal, wherein the sampling terminal is a preset terminal that is used as a statistical sample during statistics of system language settings;
  receiving a feedback result of the sampling terminal for the system language query instruction;
  counting, according to the feedback result, a number of times a respective language in the language library is set to the system language; and
  determining priorities of languages according to the number of times the respective language is set to the system language, wherein priority of the respective language is positively related to the number of times the respective language is set to the system language.

6. The non-transitory computer readable storage medium according to claim 5, wherein after the priorities of languages are determined according to the number of times the respective language is set to the system language, the method further comprises:
if a SIM card is not installed in the target terminal, acquiring location information of the target terminal, and then adjusting a priority of a language corresponding to the location information to a highest priority;
obtaining an address book and short message information from the SIM card if the SIM card is installed in the target terminal;
adjusting a priority of a language used in the address book and the short message information to a highest priority if the address book and the short message information are not empty;
if the address book and the short message information are empty, acquiring a home location of the SIM card and then adjusting a priority of a language corresponding to the home location to a highest priority.

7. A system language switching terminal device, comprising a memory, a processor, and computer readable instructions stored in the memory and executable on the processor, wherein the processor implements the following steps when executing the computer readable instructions:
obtaining a preset image for setting a system language of a target terminal;
extracting text information in the preset image, wherein extracting the text information comprises:
performing graying processing on the preset image to obtain a gray-scale image of the preset image;
performing equalization processing on the gray-scale image, and mapping gray values of the gray-scale image according to a preset mapping rule, to obtain an equalized gray-scale image of the preset image, wherein each mapped gray value is proportional to a corresponding cumulative distribution probability;
performing binarization processing on the equalized gray-scale image to obtain a binary image of the preset image;
denoising the binary image to obtain a denoised image of the preset image; and
extracting text information in the denoised image;
determining a target language corresponding to the text information, wherein determining the target language comprises:
selecting a language with a highest priority from a preset language library, as a current matching language;
calculating a degree of matching between the text information and the current matching language, wherein calculating the degree of matching comprises:
comparing characters in the text information with an identification template respectively, wherein if a character is found in the identification template, the character is successfully matched, and wherein if the character is not found in the identification template, the character matching fails;
dividing a total number of successfully matched characters by a total number of the characters;
obtaining the degree of matching between the text information and the current matching language, wherein if the degree of matching between the text information and the current matching language is less than or equal to a preset threshold, a language with a highest priority that has not been matched as the new current matching language is selected from the language library, and then the step of calculating the degree of matching between the text information and the current matching language is executed; and
determining the current matching language as the target language if the degree of matching between the text information and the current matching language is greater than the threshold; and
switching the system language of the target terminal to the target language.

8. The system language switching terminal device according to claim 7, wherein setting priorities of languages in the language library is performed by:
sending a system language query instruction to a sampling terminal, wherein the sampling terminal is a preset terminal that is used as a statistical sample during statistics of system language settings;
receiving a feedback result of the sampling terminal for the system language query instruction;
counting, according to the feedback result, a number of times a respective language in the language library is set to the system language; and
determining priorities of languages according to the number of times the respective language is set to the system language, wherein the priority of the respective language is positively related to the number of times the respective language is set to the system language.

9. The system language switching terminal device according to claim 8, wherein after the priorities of languages are determined according to the number of times the respective language is set to the system language, the method further comprises:
if a SIM card is not installed in the target terminal, acquiring location information of the target terminal, and then adjusting a priority of a language corresponding to the location information to a highest priority;
obtaining an address book and short message information from the SIM card if the SIM card is installed in the target terminal;
adjusting a priority of a language used in the address book and the short message information to a highest priority if the address book and the short message information are not empty;
if the address book and the short message information are empty, acquiring a home location of the SIM card and then adjusting a priority of a language corresponding to the home location to a highest priority.

\* \* \* \* \*